United States Patent
Iwata

(10) Patent No.: US 9,740,530 B2
(45) Date of Patent: Aug. 22, 2017

(54) DECREASING THE PRIORITY OF A USER BASED ON AN ALLOCATION RATIO

(71) Applicant: FUJITSU LIMITED, Kawasaki-shi, Kanagawa (JP)

(72) Inventor: Akitaka Iwata, Ichinomiya (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/942,358

(22) Filed: Nov. 16, 2015

(65) Prior Publication Data
US 2016/0139959 A1    May 19, 2016

(30) Foreign Application Priority Data

Nov. 18, 2014  (JP) .................. 2014-233932
Mar. 18, 2015  (JP) .................. 2015-054979

(51) Int. Cl.
*G06F 9/46*    (2006.01)
*G06F 9/50*    (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

2009/0288090 A1*  11/2009  Ujibashi ............... G06F 9/5011
                                                    718/103

FOREIGN PATENT DOCUMENTS

JP    62-210546    9/1987
JP    2009-277041  11/2009

* cited by examiner

*Primary Examiner* — Wissam Rashid
(74) *Attorney, Agent, or Firm* — Staas & Halsey LLP

(57) ABSTRACT

An information processing system includes: a memory configured to store job requests each of which is to be assigned to one of computing resources based on a priority which is determined by an allocation ratio assigned for each of a plurality of users; and processing circuitry configured to: assign first job request to the one of the computing resources; determine, when the first job request is assigned, a decrease degree of the priority of a first user corresponding to the first job request based on an allocation ratio of the first user and allocation ratio of other users whose job requests are stored in the memory; modify the priority of the first user based on the determined decrease degree of the priority; and assign second job request to one of the computing resources, based on the modified priority of the first user and priority of remaining plurality of users.

13 Claims, 13 Drawing Sheets

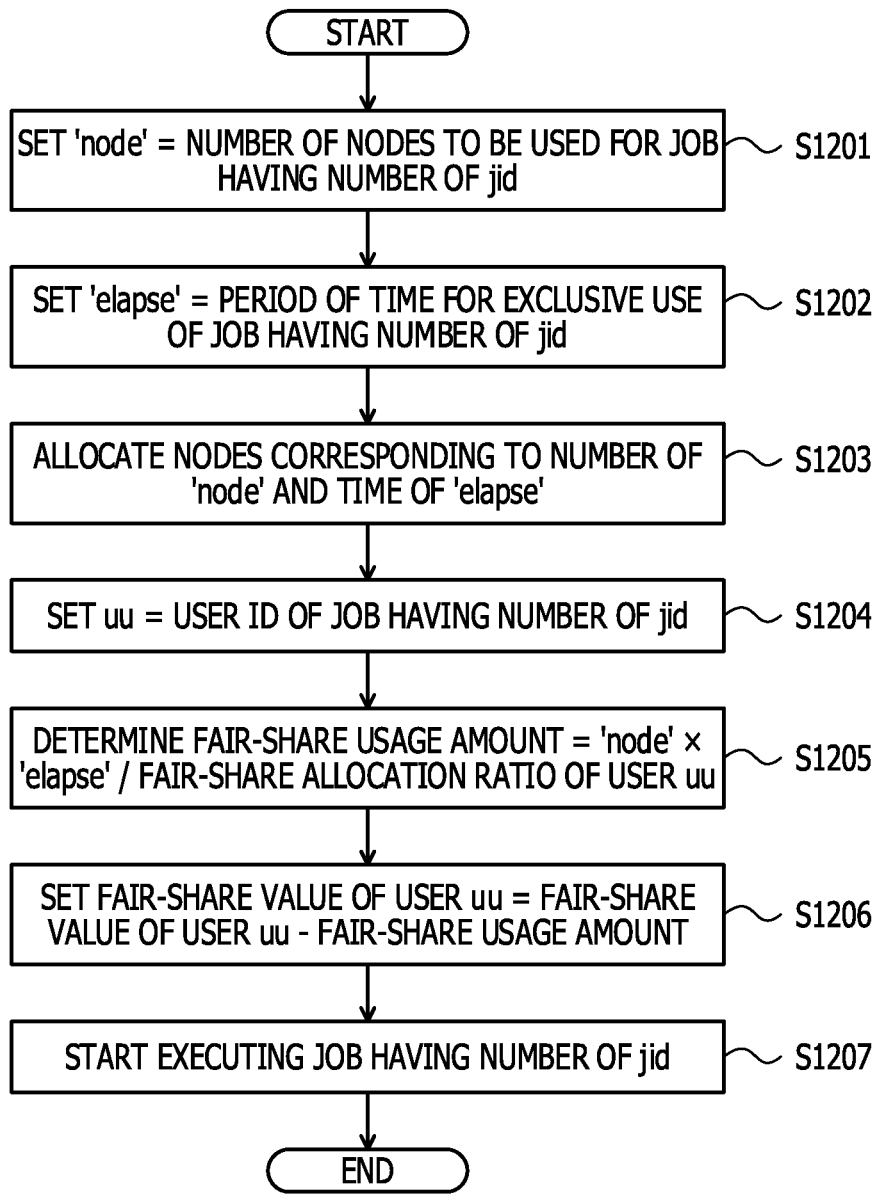

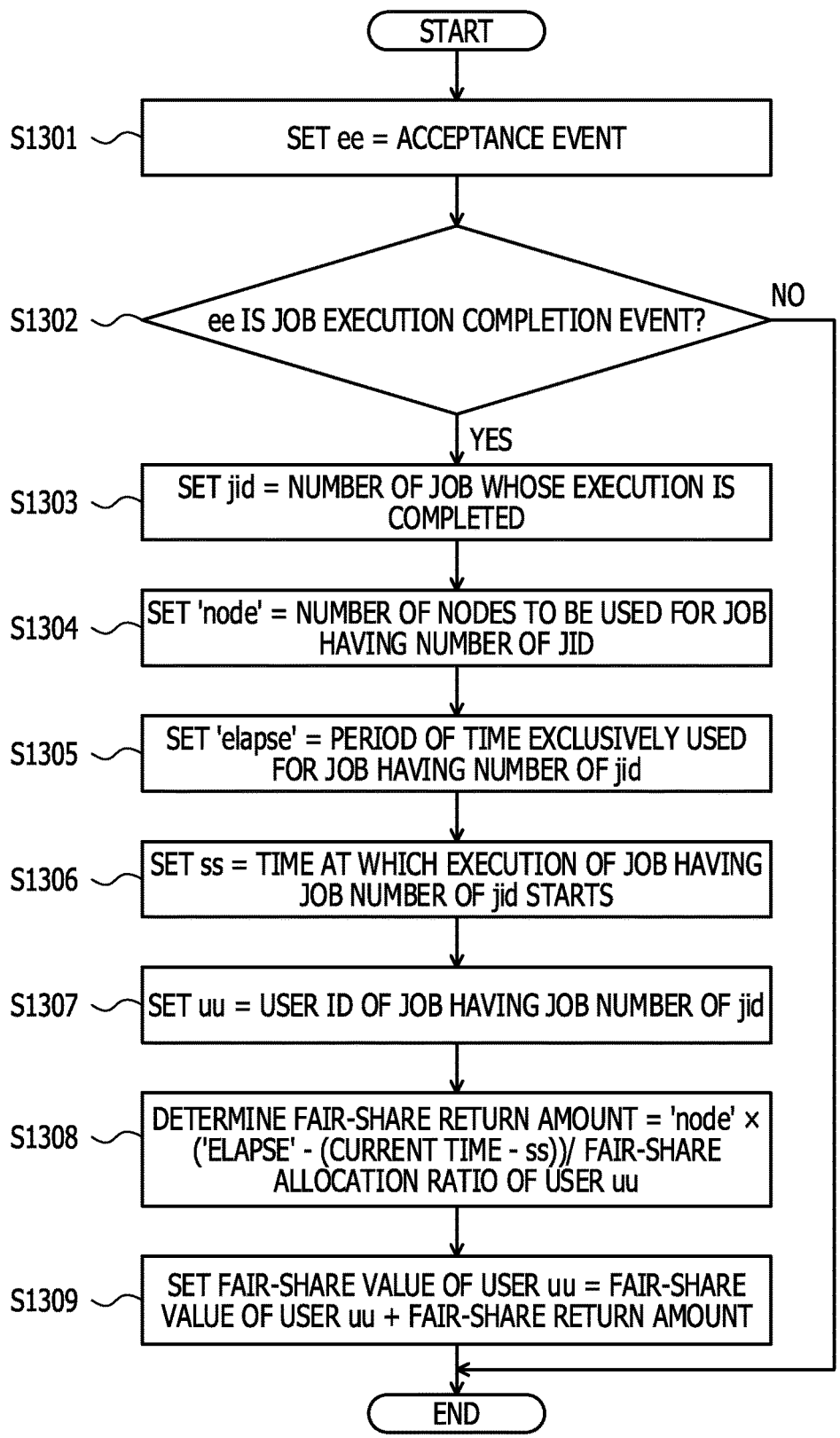

DECREASING THE PRIORITY OF A USER BASED ON AN ALLOCATION RATIO

CROSS-REFERENCE TO RELATED APPLICATIONS

This application is based upon and claims the benefit of priority of the prior Japanese Patent Application No. 2014-233932, filed on Nov. 18, 2014, and the prior Japanese Patent Application No. 2015-054979, filed on Mar. 18, 2015, the entire contents of which are incorporated herein by reference.

FIELD

The embodiment discussed herein is related to a system a method and a medium.

BACKGROUND

There are existing techniques by which, in response to computing resources of processors being allocated to each of a plurality of jobs, the priority used when computing resources of processors are allocated to each job is lowered by a given value. One example of the related art techniques is a technique by which, in response to computing resources being allocated to jobs, the priority is raised with time based on a restoration rate in accordance with the amount of computing resources available for each user per unit time. Another example is a technique by which, when the actual central processing unit (CPU) resource allocation performance is higher than or equal to an allocation ratio of CPU resources specified in advance for a job group, jobs belonging to that job group are caused to enter a state where the jobs are not able to be scheduled.

As examples of the related-art techniques, Japanese Laid-open Patent Publication No. 2009-277041 and Japanese Laid-open Patent Publication No. 62-210546 are known.

SUMMARY

According to an aspect of the invention, an information processing system includes: a memory configured to store a plurality of job requests of a plurality of users, each of the job requests are to be assigned to at least one of a plurality of computing resources based on a priority, the priority being determined by an allocation ratio assigned for each of the plurality of users; and processing circuitry configured to: assign a first job request among the plurality of job requests to the at least one of the plurality of computing resources; determine, when the first job request is assigned, a decrease degree of the priority of a first user corresponding to the first job request based on an allocation ratio of the first user and allocation ratios of other plurality of users whose job requests are stored in the memory; modify the priority of the first user based on the determined decrease degree of the priority of the first user; and assign a second job request among the plurality of job requests to at least one of the plurality of computing resources, based on the modified priority of the first user, a priority of the second user and priority of remaining plurality of users whose job requests are stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a flowchart illustrating an example of a computing resource allocation process procedure; and FIG. 13 is a flowchart illustrating an example of an event-wait process procedure.

DESCRIPTION OF EMBODIMENT

According to related-art techniques, there are some cases where computing resources are not able to be allocated to jobs requested by each user in a computing-resource allocation ratio determined for the user. For example, if the value obtained by multiplying the determined ratio by an amount of time elapsed is added to the priority of each user, the difference in the value added varies with time, such as a difference corresponding to a given value by which the priority is lowered when computing resources are allocated to jobs requested by each user, and a difference corresponding to twice the given value. Consequently, if the value obtained by multiplying the determined ratio by an amount of time elapsed is added to the priority of each user, computing resources are not able to be allocated in a determined ratio to jobs requested by each user.

In one aspect, an object of the present embodiment is to provide a technique by which computing resources may be allocated to jobs requested by each user in an allocation ratio of computing resources for each user.

Hereinafter, an embodiment will be described with reference to the accompanying drawings.

Figure 1:
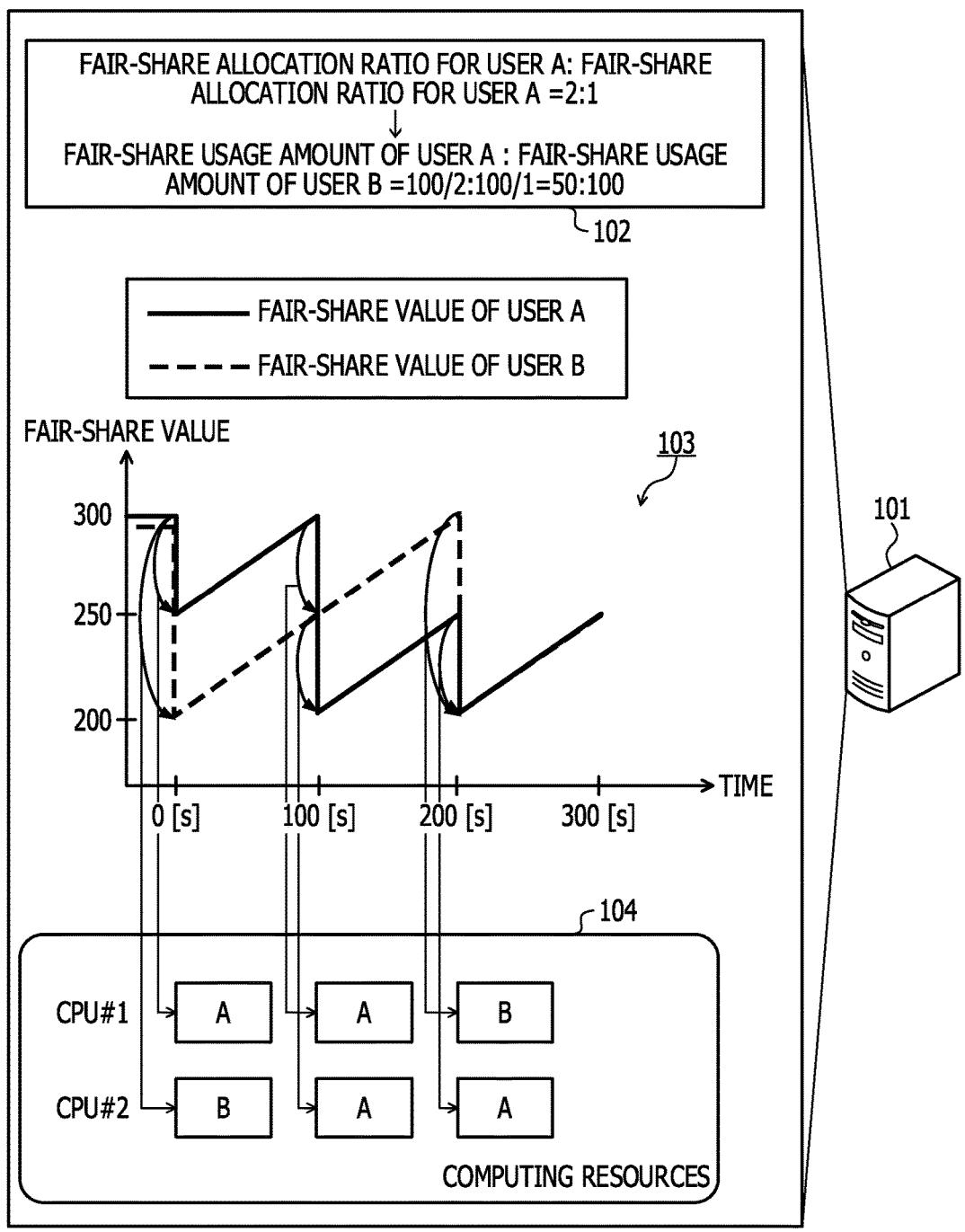
FIG. 1 is an explanatory diagram illustrating an operating example of a parallel processing device according to the present embodiment.

FIG. 1 is an explanatory diagram illustrating an operating example of a parallel processing device 101 according to the present embodiment. The parallel processing device 101 is a computer that allocates computing resources to jobs requested by each of a plurality of users. For example, for a computer including a single processor, the parallel processing device 101 allocates the time for exclusively using the processor, in terms of computing resources, to jobs requested by the user. For a computer including a plurality of processors, the parallel processing device 101 allocates the time for exclusively using the processors×the number of processors, in terms of computing resources, to jobs requested by the user. The computer including a plurality of processors may be a computer including a processor including a plurality of cores, a computer including a processor group in which single-core processors are arranged in parallel, or a plurality of computers including single-core processors.

A computer including a single or a plurality of computing devices may be the parallel processing device 101 or may be another device. The other device may be, for example, clustered personal computers. In conjunction with FIG. 1, the case where the parallel processing device 101 is a processor group in which two CPUs, which are single-core processors, are arranged in parallel will be described, by way of example, for the sake of simplicity.

The jobs represent processing units from the viewpoint of the user. Concepts similar to the jobs include, for example, processes that are executable units of a program and that have their own memory space, and threads that are executable units of a program and, when included in the same process, share memory space. Consequently, the parallel processing device 101 may allocate computing resources to a plurality of threads and a plurality of processes as a plurality of jobs.

Next, processing of allocating computing resources to jobs will be described. A job scheduler for allocating jobs rearranges jobs submitted by operations of users or the like in accordance with the sequence in which the jobs are submitted, or predetermined static priorities. Here, the static priorities are priorities among users. Then, the job scheduler searches for available computing resources to be used for the jobs and allocates the computing resources to the jobs in the order in which the jobs are rearranged in the static priorities of the users.

Here, allocating jobs only in accordance with the static priorities sometimes leads to a situation where all the computing resources are used only for jobs requested by a user having a higher static priority and jobs submitted earlier by some user. Accordingly, the job scheduler allocates computing resources to jobs using dynamic priorities of users, the dynamic priorities being updated as occasion arises when the job scheduler is in operation. Specifically, the job scheduler sets priorities so as to lower the dynamic priorities of users, when the amount of computing resources being used by the users is large or when the running time of jobs being executed is long, and raise the dynamic priorities of other users correspondingly.

The dynamic priority may indicate that the larger the value, the higher the priority given to a job requested by a user, or may indicate that the smaller the value, the higher the priority given to the job requested by the user. The dynamic priority may be a numerical value or may be a rank such as "high", "medium", or "low".

However, there are cases where computing resources are not able to be allocated to jobs requested by each user at a computing-resource allocation ratio for the user. For example, once a value obtained by multiplying the determined ratio by an amount of time elapsed is added to the priority of each user, the difference in the value added varies with time, such as a difference corresponding to a given value by which the priority is lowered when computing resources are allocated to jobs requested by each user, and a difference corresponding to twice the given value. Consequently, the difference in the value added corresponds to a given value at one timing and corresponds twice the given value at another timing. In this case, at one timing, one user differs from other users in that the number of times computing resources are allocated to the user is larger than the number of times they are allocated to other users by one, and, at another timing, one user differs from other users in that the number of times computing resources are allocated to the user is larger than the number of times they are allocated to other users by two. In such a manner, once a value obtained by multiplying a determined ratio by an amount of time elapsed is added to the dynamic priority of each user, it is no longer possible to allocate computing resources to each job in a determined ratio.

It is conceivable that when computing resources specified in advance for each user have been exhausted, jobs requested by each user are caused to enter a state where the jobs are not able to be scheduled, so that the determined ratios will be ensured. However, in this case, some of the computing resources are not allocated to jobs. This reduces the processing performance of processors. In addition, monitoring the amount of computing resources allocated to each job is more difficult as the number of jobs and the number of processors increase. Here, one of the reasons why it is desired to allocate computing resources to jobs requested by each user in an allocation ratio of computing resources is, for example, that it is desired that computing resources are allocated in accordance with the ratio of the amount of money paid by a user A for use of computers to the amount of money paid by a user B for use of computers.

Accordingly, the parallel processing device 101 according to the present embodiment determines, based on an allocation ratio of computing resources for each user, the degree to which the dynamic priority of each user is lowered by allocating computing resources to jobs requested by the user. Thereby, the difference in the dynamic priority of each user is in accordance with the allocation ratio of computing resources for the user. Therefore, the parallel processing device 101 may allocate computing resources in accordance with the allocation ratio of computing resources for each user.

In conjunction with FIG. 1, the processing of the parallel processing device 101 will be described. The parallel processing device 101 illustrated in FIG. 1 includes a CPU #1 and a CPU #2. The parallel processing device 101 runs a job requested by the user A and a job requested by the user B. The allocation ratio of computing resources of the user A to the user B is assumed to be 2:1.

For example, the dynamic priorities are ranks such as "high", "medium", and "low". At this point, the parallel processing device 101 determines that the ranks by which the dynamic priorities of the user A and the user B are lowered by allocating computing resources to jobs requested by each user are one rank and two ranks, respectively, from the inverse allocation ratio of computing resources of 1:2.

The case where the value called "a fair-share value" is used as the dynamic priority will be described below. The highest fair-share value is limited to a fair-share initial value, and the fair-share value is a value not greater than the fair-share initial value. The fair-share value may be a negative value. The fair-share value is a value indicating that the larger the value is, the higher the priority given to the job requested by the user is. The allocation ratio of computing resources is sometimes referred to as a fair-share allocation ratio hereinafter. In the examples illustrated in FIG. 1, the fair-share allocation ratio for the user A: the fair-share allocation ratio for the user B is 2:1. The degree to which the fair-share value of each user is decreased by allocating computing resources to jobs requested by each user is sometimes called a fair-share usage amount. The degree to which the fair-share value per unit time is increased is sometimes called a recovery value per unit time.

In the example illustrated in FIG. 1, the job requested by the user A may include a plurality of jobs, a single job run many times, or single jobs simultaneously run. The job requested by the user B is assumed to be similar to the job requested by the user A. When the job is executed once, computing resources of 100 seconds×1 CPU=100 are assumed to be used for the job. The fair-share initial values of the user A and the user B are assumed to be 300. Regarding the recovery value per unit time, the recovery values per second of the user A and the user B are assumed to be both 0.5. For the sake of simplicity of description, when the fair-share value of the user A and the fair-share value of the user B are the same, the parallel processing device 101 gives priority to the job requested by the user A in allocating computing resources.

The parallel processing device 101 determines the fair-share usage amount of each user based on the fair-share allocation ratio assigned to the user. Here, if the amounts of computing resources used for the jobs requested by the user A and the jobs requested by the user B have fixed values at any time, the fair-share allocation ratio is determined in advance. Therefore, the parallel processing device 101 may determine the fair-share usage amount of each user at any timing. For example, the parallel processing device 101 determines the fair-share usage amount of each user prior to starting the operation.

In the example illustrated in FIG. 1, as denoted by reference numeral 102, the parallel processing device 101 determines a value obtained by multiplying the amount of computing resources used for a job requested by each user by the inverse fair-share allocation ratio assigned to the user, as the fair-share usage amount of each job. In the example illustrated in FIG. 1, the parallel processing device 101 determines that the fair-share usage amount of the user A: the fair-share usage amount of the user B=100/2:100/1=50: 100.

A graph 103 illustrated in FIG. 1 represents the time series variation of the fair-share value when computing resources are allocated to jobs requested by each user in accordance with the determined fair-share usage amounts. A frame 104 schematically represents computing resources.

The horizontal axis of the graph 103 represents time. The vertical axis of the graph 103 represents the fair-share value. The graph 103 represents the time series variation of the fair-share value of the user A in a solid line and represents the time series variation of the fair-share value of the user B in a broken line. At a time of 0 second, the fair-share values of the users A and B are both 300, and therefore the parallel processing device 101 allocates 0 to 100 second of a CPU #1 to a job requested by the user A and allocates 0 to 100 second of the CPU #2 to a job requested by the user B. Then, the parallel processing device 101 sets the fair-share value of the user A to 300−50=250 and the fair-share value of the user B to 300−100=200.

Next, at a time of 100 sec, the parallel processing device 101 restores the fair-share value of the user A and the fair-share value of the user B by the recovery value per second×the amount of time elapsed=0.5×100=50. Then, since the fair-share value of the user A is 300 and the fair-share value of the user B is 250, the parallel processing device 101 allocates 100 second to 200 second of the CPU #1 to a job requested by the user A. Then, the parallel processing device 101 sets the fair-share value of the user A to 300−50=250. Subsequently, since the fair-share value of the user A is 250 and the fair-share value of the user B is 250, the parallel processing device 101 allocates 100 second to 200 second of the CPU #2 to a job requested by the user A. Then, the parallel processing device 101 sets the fair-share value of the user A to 250−50=200.

Then, at a time of 200 second, the parallel processing device 101 restores the fair-share value of the user A and the fair-share value of the user B by 0.5×100=50. Since the fair-share value of the user A is 250 and the fair-share value of the user B is 300, the parallel processing device 101 allocates 200 second to 300 second of the CPU #1 to a job requested by the user B. Then, the parallel processing device 101 sets the fair-share value of the user B to 300−100=200. Subsequently, since the fair-share value of the user A is 250 and the fair-share value of the user B is 200, the parallel processing device 101 allocates 200 second to 300 second of the CPU #2 to the job requested by the user A. Then, the parallel processing device 101 sets the fair-share value of the user A to 250−50=200.

From the above, it is confirmed for the allocated computing resources that all the computing resources of the CPUs #1 and #2 are allocated to jobs requested by either of the users A and B, and the ratio of resources of the user A to those of the user B is 4:2=2:1. In such a manner, the parallel processing device 101 may decrease the likelihood of computing resources being not allocated to any job and allocate computing resources to jobs requested by each user in accordance with the fair-share allocation ratio for each user. The difference in the fair-share value between the user A and the user B is 50 at any time between 0 second to 100 second, which is in accordance with the fair-share allocation ratio of 2:1. Additionally, at 200 second or later, the fair-share values of the user A and the user B are the same. This is because, at 200 sec, the amounts of computing resources allocated to the user A and the user B have a ratio of 2:1. Then, at 200 second or later, the parallel processing device 101 allocates computing resources to the user A and the user B so as to maintain the ratio of 2:1.

Note that although, in the description given above, the parallel processing device 101 allocates computing resources based on the fair-share allocation ratio for each user, the parallel processing device 101 may allocate computing resources based on the fair-share allocation ratio for each user group including one or more users. Next, FIG. 2 illustrates an example in which the parallel processing device 101 is applied to a parallel processing system 200.

Figure 2:
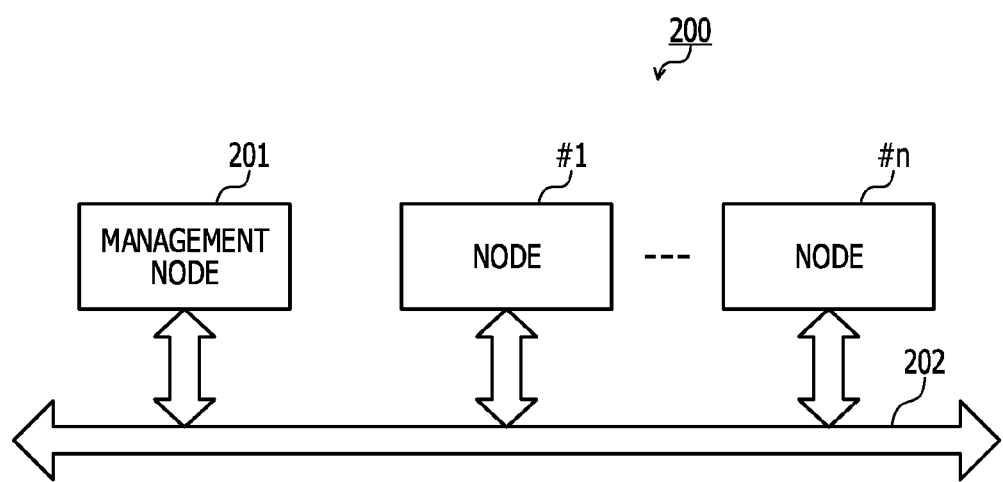
FIG. 2 is a block diagram illustrating a configuration example of a parallel processing system.

FIG. 2 is a block diagram illustrating an example of a configuration of the parallel processing system 200. The parallel processing system 200 includes a management node 201 and a plurality of nodes, node #1 to #n. The number n is an integer of two or more. Here, the management node 201 corresponds to the parallel processing device 101 illustrated in FIG. 1. The nodes #1 to #n correspond to the CPUs #1 and #2 illustrated in FIG. 1. The management node 201 and the nodes #1 to #n are coupled by an interconnect 202. The parallel processing system 200 is, for example, a super computer.

The management node 201 is a device that allocates at least the nodes #1 to #n among the management node 201 and the nodes #1 to #n to jobs. The nodes #1 to #n are devices that execute the jobs to which they are allocated. In the description hereinafter, the management node 201 allocates nodes in units of nodes to jobs requested by a user.

Figure 3:
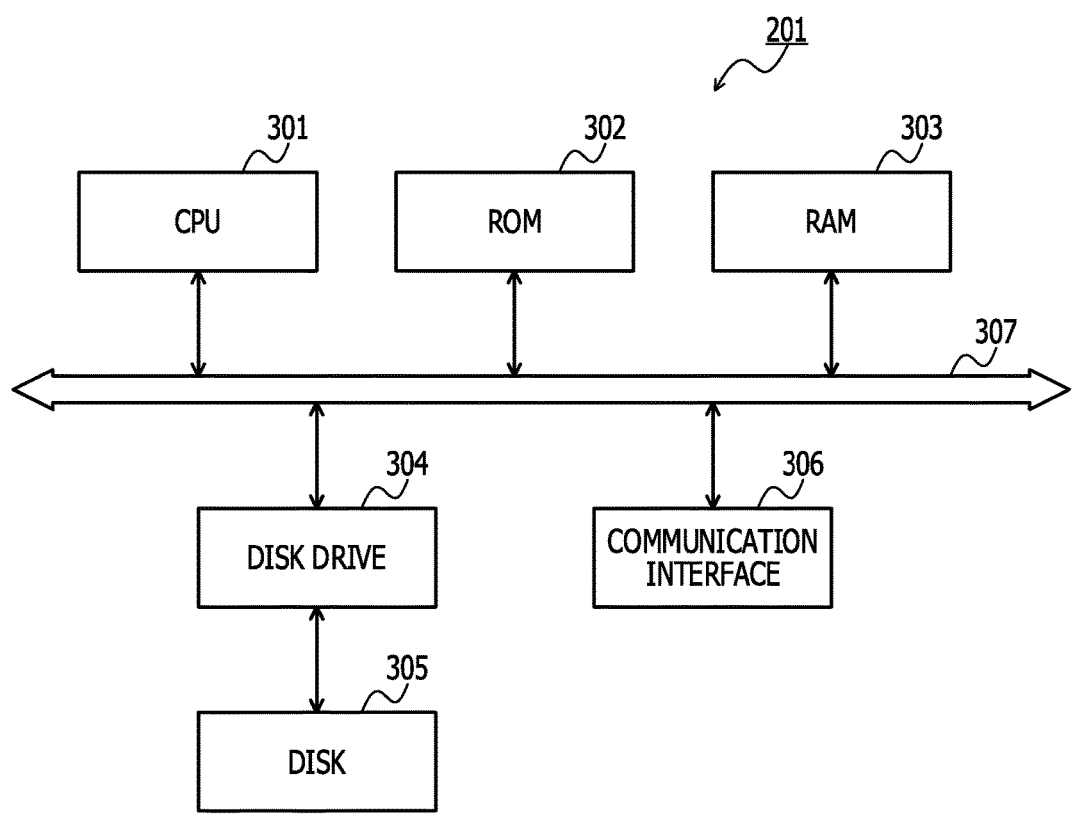
FIG. 3 is a block diagram illustrating an example of hardware of a management node.

FIG. 3 is a block diagram illustrating an example of hardware of the management node 201. In FIG. 3, the management node 201 includes a CPU 301, a read-only memory (ROM) 302, and a random-access memory (RAM) 303. The management node 201 also includes a disk drive 304 and a disk 305, and a communication interface 306. The CPU 301 to the disk drive 304 and the communication interface 306 are each coupled by a bus 307.

The CPU 301 is a processing unit responsible for control over the entire management node 201. The management node 201 may include a plurality of CPUs. The ROM 302 is a nonvolatile memory that stores programs such as a boot program. The RAM 303 is a nonvolatile memory that is used as a work area of the CPU 301.

The disk drive 304 is a control device that controls reading and writing of data from and to the disk 305 in accordance with control of the CPU 301. As the disk drive 304, for example, a magnetic disk drive, an optical disk drive, a solid state drive, or the like may be employed. The disk 305 is a nonvolatile memory that stores data written under control of the disk drive 304. For example, when the disk drive 304 is a magnetic disk drive, a magnetic disk may be employed as the disk 305. When the disk drive 304 is an optical disk drive, an optical disk may be employed as the disk 305. When the disk drive 304 is a solid state drive, a semiconductor memory made of a semiconductor device, a so-called semiconductor disk, may be employed as the disk 305.

The communication interface 306 is a control device that is responsible for a network and an inner interface and that controls input and output of data from and to other devices. Specifically, the communication interface 306 is coupled via a network passing through communication lines to other devices. As the communication interface 306, for example, a modem, a local area network (LAN), or the like may be employed.

When the administrator of the parallel processing system 200 directly operates the management node 201, the management node 201 may include hardware such as a display, a keyboard, and a mouse. Although not illustrated in the drawings, the nodes #1 to #n includes hardware similar to that of the management node 201.

(Functional Configuration Example of Management Node 201)

Figure 4:
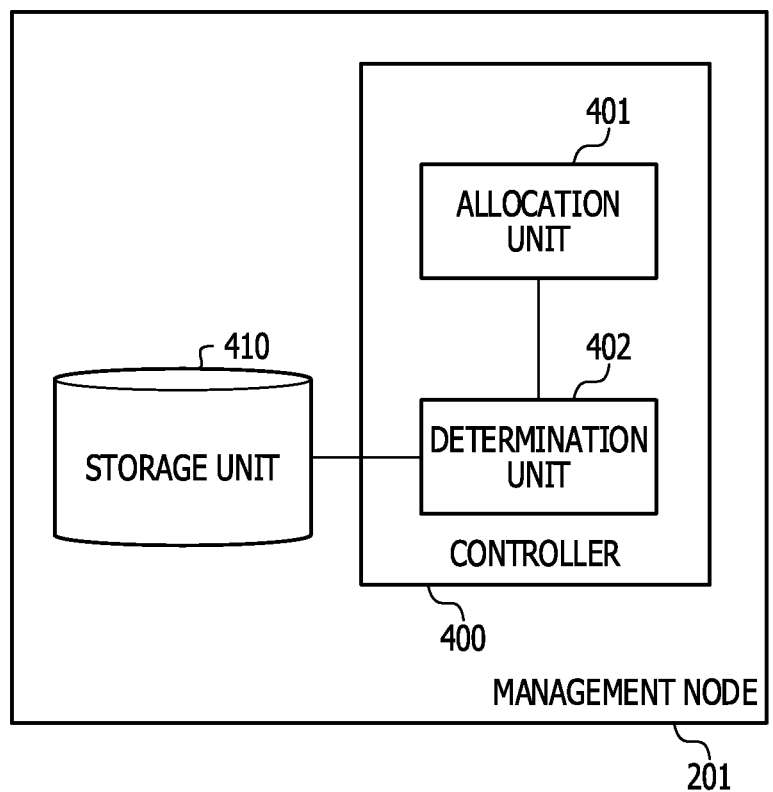
FIG. 4 is a block diagram illustrating a functional configuration example of the management node.

FIG. 4 is a block diagram illustrating a functional configuration example of the management node 201. The management node 201 includes a controller 400. The controller 400 includes an allocation unit 401 and a determination unit 402. The controller 400 implements functions of units when the CPU 301 executes a job control program stored in a storage device. The storage device is, specifically, for example, the ROM 302, the RAM 303, or the disk 305 illustrated in FIG. 3. The processing results of the components are stored in a register of the CPU 301, a cache memory of the CPU 301, and the like.

The management node 201 may access a storage unit 410. The storage unit 410 is storage devices such as the RAM 303 and the disk 305. The storage unit 410 stores the fair-share initial value of each user, the recovery value per unit time, the recovery factor of each user, the fair-share value of each user, and the fair-share allocation ratio for each user.

The allocation unit 401 allocates computing resources to a job requested by each user based on the fair-share value of the user. Specifically, for example, the allocation unit 401 allocates a certain time period for using the node, as computing resources, to a job requested by each user.

The determination unit 402 determines the fair-share usage amount of each user based on the fair-share allocation ratio for each user read from the storage unit 410. For example, if computing resources used for a job requested by each user have a fixed value at any time, the determination unit 402 determines the value obtained by dividing a given value by the fair-share allocation ratio for the user, as the fair-share usage amount of the user. The given value may be any value. If the amount of computing resources used for a job requested by each user varies, the determination unit 402 may determine the value obtained by dividing the computing resources used for jobs requested by each user by the fair-share allocation ratio of the user, as the fair-share usage amount of the user.

It is assumed that the computing resources used for a job requested by each user is any node among a plurality of nodes. At this point, the length of time over which the node is allocated to the job requested by each user is fixed at any time. In this case, in response to any node being allocated to the job requested by each user, the determination unit 402 may determine the fair-share usage amount of each user based on the number of allocated nodes and the fair-share allocation ratio. For example, the determination unit 402 determines, as the fair-share usage amount of each user, a value obtained in such a way that a value obtained by multiplying the number of nodes by the amount of computing resources used for a job requested by the user is divided by the fair-share allocation ratio for the user.

It is also assumed that the computing resources used for a job requested by each user is the period of time during which nodes are used. At this point, the number of nodes allocated to the job requested by each user is assumed to be fixed at any time. At this point, in response to the fact that the allocation unit 401 allocates, to the job requested by each user, a period of time during which nodes are used, the determination unit 402 may determine the fair-share usage amount of the user based on the time mentioned above and the fair-share allocation ratio for the user. For example, the determination unit 402 determines, as the fair-share usage amount of each user, a value obtained in such a way that a value obtained by multiplying the period of time mentioned above by the computing resources used for the job requested by the user is divided by the fair-share allocation ratio for the user.

It is also assumed that the job requested by each user exits within the period of time mentioned above after the allocation unit 401 allocates the period of time mentioned above to the job requested by the user. The exiting of the job requested by each user is triggered when the job requested by the user is completed or suspended. At this point, the determination unit 402 determines the degree to which the fair-share value is increased by the job requested by each user exiting, based on the amount of time from a time at which the job requested by each user exits to a time at which the period of time mentioned above has elapsed, and the fair-share allocation ratio for each user. The degree to which the fair-share value is increased by exiting of the job requested by each user is sometimes referred to as a fair-share return amount hereinafter.

For example, the determination unit 402 determines, as the fair-share return amount of each user, a value obtained in such a way that a value obtained by multiplying the computing resources used for the job by the amount of time from a time at which the job exits to a time at which the period of time mentioned above has elapsed is divided by the fair-share allocation ratio for each user.

Figure 5:
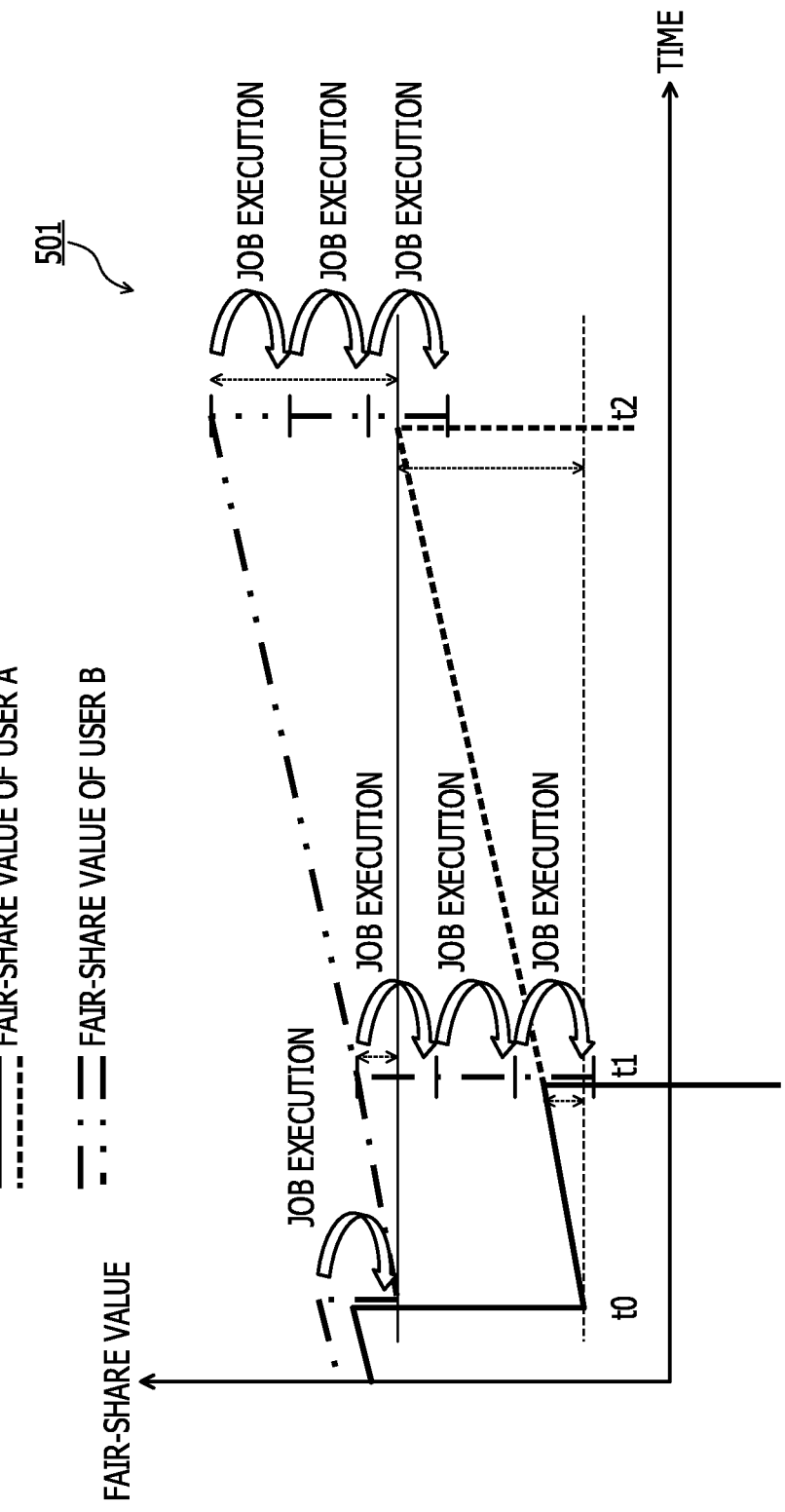
FIG. 5 is an explanatory diagram illustrating an example of resource allocation using a difference in fair-share allocation ratio.
Figure 6:
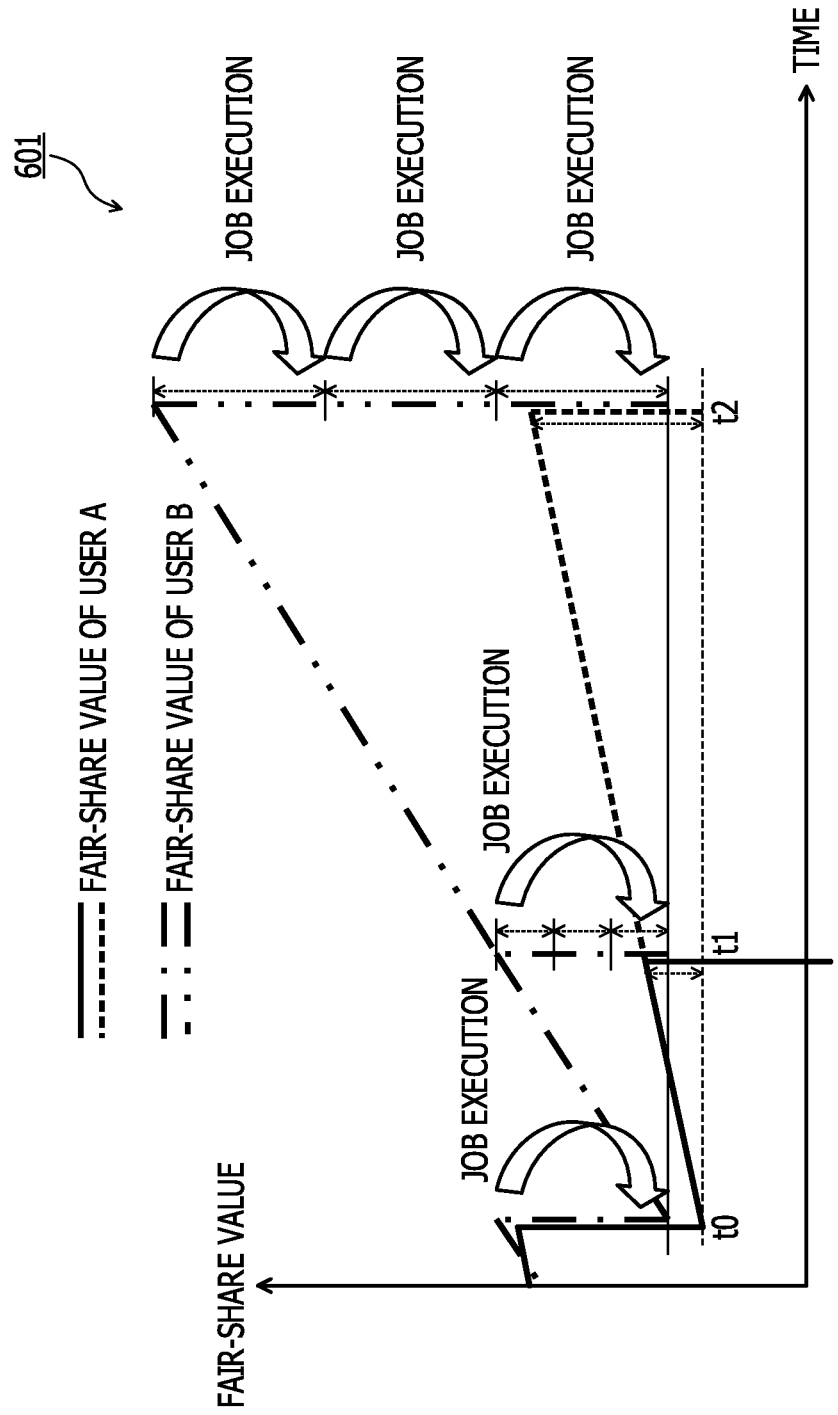
FIG. 6 is an explanatory diagram illustrating an example of resource allocation using a recovery factor.

Next, in conjunction with FIG. 5 and FIG. 6, an example of resource allocation using a difference in the fair-share allocation ratio according to the present embodiment and an example of resource allocation using a recovery factor, as a comparative example, are illustrated. In FIG. 5 and FIG. 6, the fair-share initial values of the users A and B are assumed to be the same. In FIG. 5 and FIG. 6, the fair-share allocation ratio is set such that the user A=1 and the user B=3. The fair-share allocation ratio of the user B is three times that of the user A.

FIG. 5 is an explanatory diagram illustrating an example of resource allocation using the difference in the fair-share allocation ratio. A graph 501 illustrated in FIG. 5 is a graph representing time series variations in the fair-share values when resources are allocated using the difference in the fair-share allocation ratio. The horizontal axis of the graph 501 represents time. The vertical axis of the graph 501 represents the fair-share value. The solid line and the dotted line in the graph 501 indicate the fair-share value of the user A. The alternate long and short dash line and the two dot chain line in the graph 501 indicate the fair-share value of the user B. The dotted line and the two dot chain line in the graph 501 indicate the fair-share values when there is no allocation to a job at a time t1 illustrated in FIG. 5.

At a time t0 illustrated in FIG. 5, the management node 201 allocates nodes as computing resources to jobs requested by the user A and a job requested by the user B. The allocated nodes run jobs. At the time t0 illustrated in FIG. 5, the fair-share value of the user A is as follows.

The fair-share value of the user A=the fair-share value of the user A at the time t0–the fair-share usage amount of the user A The fair-share usage amount of the user A is as follows.

The fair-share usage amount of the user A=the number of nodes×the period of time for exclusive use/1

Similarly, at the time t0 illustrated in FIG. 5, the fair-share value of the user B is as follows.

The fair-share value of the user B=the fair-share value of the user B at the time t0–the fair-share usage amount of the user B The fair-share usage of the user B is as follows.

The fair-share usage amount of the user B=the number of nodes×the period of time for exclusive use/3

Consequently, when execution of the jobs of the user A and of the user B that use the same computing resources is started, the amount of a decrease in the fair-share value of the user B is one third of that of the user A. This amount is controlled similarly even when execution of jobs is started or jobs are selected at any timing during operation. For example, both at the time t1 and at a time t2 in the graph 501, it is indicated that the jobs of the user B the number of which is three times that of the jobs of the user A are able to be executed.

FIG. 6 is an explanatory diagram illustrating an example of resource allocation using a recovery factor. A graph 601 illustrated in FIG. 6 is a graph representing time series variations of the fair-share values when resources are allocated using a recovery factor. The horizontal axis of the graph 601 represents time. The vertical axis of the graph 601 represents the fair-share value. The solid line and the dotted line in the graph 601 represent the fair-share value of the user A. The alternate long and short dash line and the two dot chain line in the graph 601 represent the fair-share value of the user B. The dotted line and the two dot chain line in the graph 601 represent the fair-share values at a time t1 illustrated in FIG. 6 when there is no allocation to a job.

If, at a time t0 in the graph illustrated in FIG. 6, execution of jobs that uses the same computing resources for the user A and for the user B is started, the fair-share values of the user A and the user B decrease by the same amount. Here, when resources are allocated using a recovery factor, the recovery amount of the fair-share value of the user B is three times that of the fair-share value of the user A. Consequently, depending on time, the difference in the fair-share value between the user A and the user B varies.

For example, in FIG. 6, when jobs are not executed at the time t1, at a time t2, the fair-share value of the user B is a value with which three jobs are able to be executed preferentially, as compared to the fair-share value of the user A, and thus may be in accordance with an allocation ratio of three to one. However, at the time t1 illustrated in FIG. 6, the fair-share value of the user B is a value with which only one job is able to be executed preferentially as compared to the fair-share value of the user A, and the method of resource allocation using a recovery factor is not in accordance with the allocation ratio of three to one.

Figure 7:
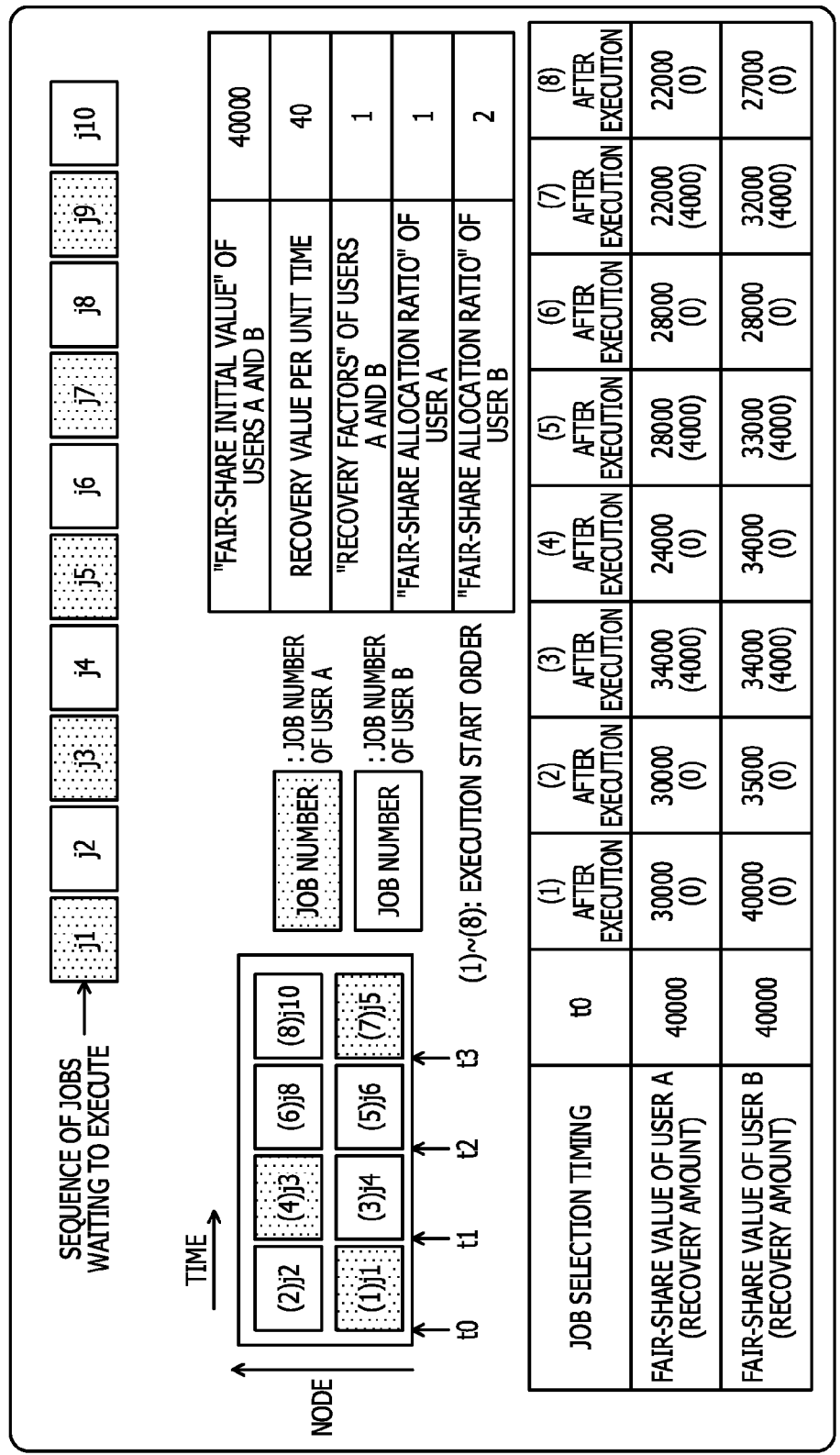
FIG. 7 is an explanatory diagram illustrating an example in which resources are allocated using a difference in fair-share allocation ratio.
Figure 8:
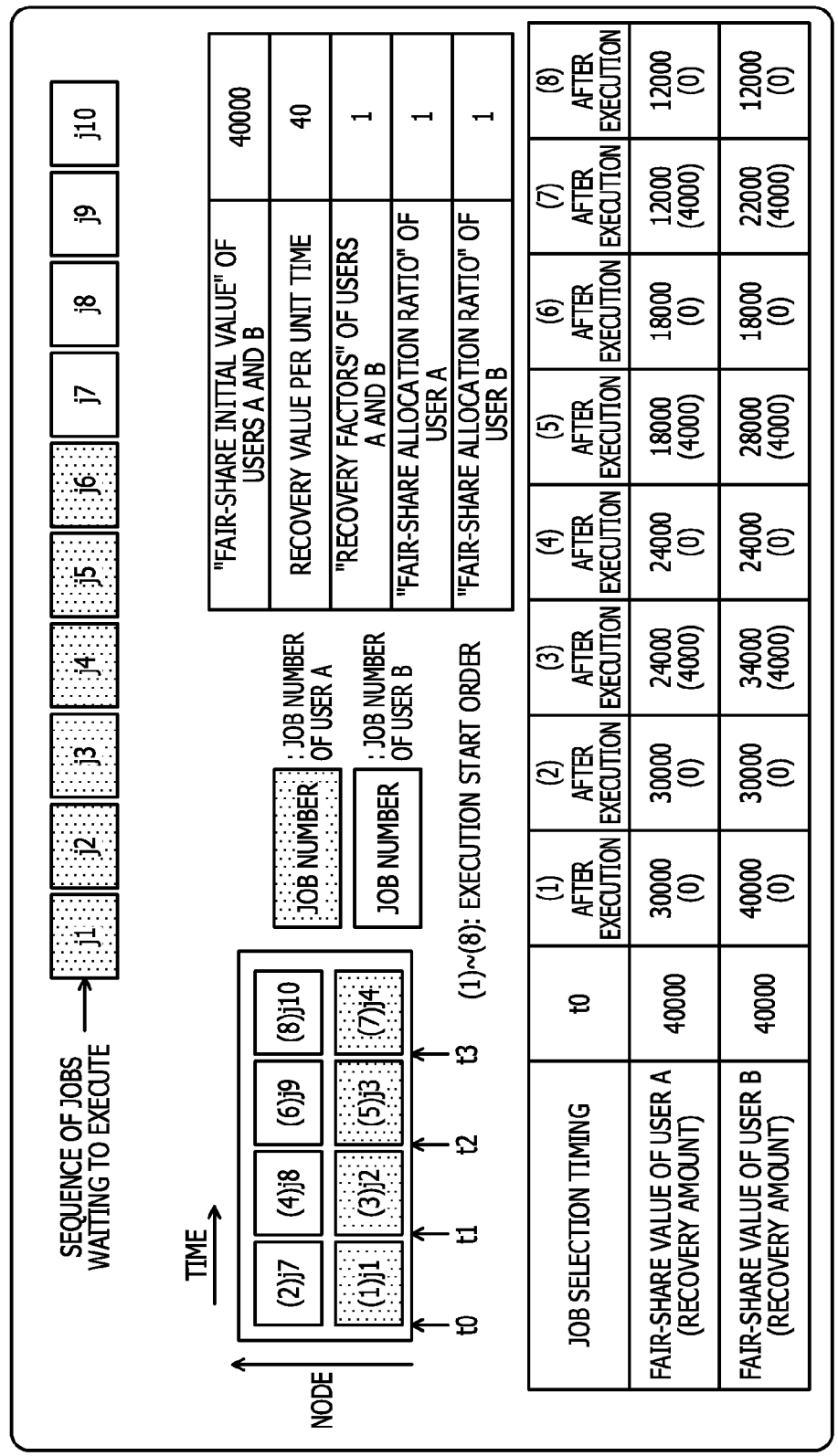
FIG. 8 is an explanatory diagram illustrating another example in which resources are allocated using a difference in fair-share allocation ratio.

Next, in conjunction with FIG. 7 and FIG. 8, two examples in which resources are allocated using a difference in the fair-share allocation ratio are illustrated. As the setting shared by the cases illustrated in FIG. 7 and FIG. 8, it is assumed that jobs waiting for execution are submitted in ascending order of "job numbers", hatched jobs are jobs requested by the user A, and jobs that are not hatched are jobs requested by the user B. In FIG. 7 and FIG. 8, jobs are denoted by "jx", where x is an integer of one or more.

The fair-share initial values of both the user A and the user B are 40000. The recovery values per unit time for both the user A and the user B are 40. The recovery factors for both the user A and the user B are one. The number n of nodes included in the parallel processing system 200 is 200. The computing resources used for all the jobs are 100 nodes×100 seconds.

FIG. 7 is an explanatory diagram illustrating an example in which resources are allocated using a difference in the fair-share allocation ratio. In the example of FIG. 7, jobs having job numbers j1, j3, j5, j7, and j9 are submitted by the user A, and jobs having job numbers j2, j4, j6, j8, and j10 are jobs submitted by the user B. Then, to achieve the fair-share allocation ratio of the user A to the user B being 1:2, the user A=1 and the user B=2. To allocate computing resources in this ratio is a target.

At a time t0 illustrated in FIG. 7, the fair-share values of the users A and B are the same as the fair-share initial values, such as the fair-share value of the user A=40000 and the fair-share value of the user B=40000, and the dynamic priorities are the same. Therefore, the management node 201 employs, as a way of job selection, the sequence in which jobs are submitted (hereinafter sometimes referred to as the submitting sequence) and causes a node allocated to a job having a job number j1 to start executing this job as illustrated at (1) in FIG. 7.

Then, once the node allocated to the job having the job number j1 starts executing the job, the management node 201 computes the fair-share value of the user A, who is the owner of the job having the job number j1, using the following equation (1) and equation (2) obtained using the fair-share allocation ratio.

$$\text{The fair-share usage amount} = \text{the number of nodes} \times \text{the period of time for exclusive use} / \text{the fair-share allocation ratio} \quad (1)$$

$$\text{The fair-share value} = \text{the fair-share value} - \text{the fair-share usage amount} \quad (2)$$

The fair-share usage amount of the user A is "100×100/1=10000" and therefore the management node 201 sets the fair-share value of the user A to 30000. When the job having the job number 1 is selected, the fair-share value of the user A=30000 and the fair-share value of the user B=40000, and therefore the dynamic priority of the user B is higher. Note that the period of time that has elapsed from the time at which the job having the job number j1 was executed is less than 1 second, and therefore the recovery amount of the fair-share value of the user A is not taken into account and is set to "0". Therefore, the management node 201, as illustrated at (2) in FIG. 7, selects the job having the job number j2 of the user B and causes a node allocated to the job having the job number j2 to start executing this job.

Upon causing the node allocated to the job having the job number j2 to start executing this job, the management node 201 computes the fair-share value of the user B, who is the owner of the job having the job number j2, using equation (1) and equation (2).

The fair-share usage amount of the user B is 100×100/2=5000, and therefore the management node 201 sets the fair-share value of the user B to 35000. At this point, all the nodes are in use, and therefore the timing at which the next job is selected is a time t1 at which execution of the jobs having the job number j1 and the job number j2 is finished.

When selecting a job at the time t1, the management node 201 adds fair-share recovery amounts in accordance with the amount of elapsed period of time to the fair-share values of the users A and B. The values added are the fair-share recovery amounts=4000 since both the recovery factors of the users A and B are set to the same value, "1". As a result, the fair-share value of the user A=34000, and the fair-share value of the user B=39000. The situation where the priority of the user B is higher continues. Therefore, the management node 201, as illustrated at (3) in FIG. 7, continuously selects the job having the job number j4 that is late in the submitting sequence and whose owner is the user B and causes the node allocated to the job having the job number j4 to start executing this job.

Upon causing the node allocated to the job having the job number j4 to start executing this job, the management node 201 computes the fair-share value of the user B, who is the owner of the job having the job number j4, using equation (1) and equation (2) and thus obtains a fair-share value of 34000.

When a job is selected after execution of the job having the job number j4, the fair-share value of the user A=34000 and the fair-share value of the user B=34000. The dynamic priorities of the user A and the user B are the same. Note that the period of time that has elapsed from a time at which the job having the job number j4 was executed is less than 1 second, and therefore the recovery amount of the fair-share value of the user A is not taken into account and is set to "0". Therefore, the management node 201 employs the submitting sequence for job selection, selects the job having the job number j3 whose owner is the user A as illustrated at (4) in FIG. 7, and causes a node allocated to the job having the job number j3 to start executing this job.

Upon causing the node allocated to the job having the job number j3 to start executing this job, the management node 201 computes the fair-share value of the user A, who is the owner of the job having the job number j3, using equation (1) and equation (2) and thus obtains a fair-share value of 24000. At this point, all the nodes are again in use, and the timing at which the next job is selected is a time t2 at which execution of the jobs having the job number j4 and the job number j3 is finished.

When selecting a job at the time t2, the management node 201 adds fair-share recovery amounts in accordance with the amount of elapsed time to the fair-share values of the users A and B. The values added are the fair-share recovery amounts=4000 since both the recovery factors of the users A and B are set to the same value, "1". As a result, the fair-share value of the user A=28000 and the fair-share value of the user B is 38000. The dynamic priority of the user B is higher. Therefore, the management node 201, as illustrated at (5) in FIG. 7, selects the job of the user B having the job number j6 that is late in the submitting sequence and causes a node allocated to the job having the job number j6 to start executing this job.

Upon causing execution of the job having the job number j6 to be started, the management node 201 computes the fair-share value of the user B, who is the owner of the job having the job number j6, in accordance with equation (1) and equation (2) and thus obtains a value of 33000.

When a job is selected after execution of the job having the job number j6, the fair-share value of the user A=28000 and the fair-share value of the user B=33000. The situation where the dynamic priority of the user B is higher continues. Note that the period of time that has elapsed from the time at which the job having the job number j6 was executed is less than 1 second, and therefore the recovery amount is not taken into account and is set to "0". Therefore, the management node 201, as illustrated at (6) in FIG. 7, continuously selects the job having the job number j8 that is late in the submitting sequence and whose owner is the user B, and causes a node allocated to the job having the job number j8 to start executing this job.

Upon causing the node allocated to the job having the job number j8 to start executing this job, the management node 201 computes the fair-share value of the user B, who is the owner of the job having the job number j8, using equation (1) and equation (2) and thus obtains a value of 28000. At this point, all the nodes are again in use, and the timing at which the next job is selected is a time t3 at which execution of the jobs having the job number j6 and the job number j8 is finished.

When selecting a job at the time t3, the management node 201 adds fair-share recovery amounts in accordance with the amount of elapsed time to the fair-share values of the users A and B. Both the values added are the fair-share recovery amounts=4000 since the fair-share recovery amounts of the users A and B are set to the same value, "1". As a result, the fair-share value of the user A=32000 and the fair-share value of the user B=32000, and thus the dynamic priorities of the users A and B are the same. Therefore, the management node 201 employs the submitting sequence for job selection, selects a job having the job number j5 whose owner is the user A as illustrated at (7) in FIG. 7, and causes a node allocated to the job having the job number j5 to start executing this job.

Upon causing the node allocated to the job having the job number j5 to start executing this job, the management node 201 computes the fair-share value of the user A, who is the owner of the job having the job number j5, using equation (1) and equation (2) and thus obtains a value of 22000.

When a job is selected after execution of the job having the job number j5, the fair-share value of the user A=22000 and the fair-share value of the user B=32000. The dynamic priority of the user B is higher. Note that the period of time that has elapsed from the time at which the job having the job number j5 was executed is less than 1 sec, and the recovery amount is not taken into account and is set to "0". Therefore, the management node 201, as illustrated at (8) in FIG. 7, selects a job having the job number j10 that is late in the submitting sequence and whose owner is the user B, and causes a node allocated to the job having the job number j10 to start executing this job.

Upon causing the node allocated to the job having the job number j10 to start executing this job, the management node 201 computes the fair-share value of the user B, who is the owner of the job having the job number j10, using equation (1) and equation (2) and thus obtains a value of 27000. At this point, all the nodes are again in use, and thereafter the management node 201 performs control in a manner similar to that described above.

By this point, since the number of executed jobs of the user A=3 and the number of executed jobs of the user B=5, the allocation ratio of computing resources that have been used for execution of jobs of the user A to the user B is 1:1.67. This does not reach a target allocation ratio of 1:2. However, this is because the number of jobs in the case illustrated in FIG. 7 is small. As seen from the order in which jobs are executed, execution of two jobs of the user A after execution of one job of the user B is repeated. Consequently, the allocation ratio of computing resources of the user A to the user B will be 1:2. This proves that resource allocation may be controlled so as to meet the target.

FIG. 8 is an explanatory diagram illustrating another example in which resources are allocated using a difference in the fair-share allocation ratio. In the example illustrated in FIG. 8, the jobs having job numbers j1 to j6 are submitted by the user A and the jobs having job numbers j7 to j10 are submitted by the user B. Then, to achieve a fair-share allocation ratio of 1:1, it is assumed that the user A=1 and the user B=1. To allocate computing resources at this ratio is a target.

At a time t0 illustrated in FIG. 8, the fair-share values of the users A and B, such as the fair-share value of the user A=40000 and the fair-share value of the user B=40000, are the same as the fair-share initial value, and thus the dynamic priorities are the same. Therefore, the management node 201 employs the submitting sequence for job selection and, as illustrated at (1) in FIG. 8, causes a node allocated to the job having the job number j1 to start executing this job.

Then, upon causing execution of the job having the job number j1 to be started, the management node 201 computes the fair-share value of the user A, who is the owner of the job having the job number j1, using equation (1) and equation (2) and thus obtains a value of 30000. When a job is selected after execution of the job having the job number j1, the fair-share value of the user A=30000 and the fair-share value of the user B=40000, and thus the dynamic priority of the user B is higher. Note that the period of time that has elapsed from the time at which the job having the job number j1 was executed is less than 1 sec, and therefore the recovery amount is not taken into account and is set to zero. Therefore, the management node 201, as illustrated at (2) in FIG. 8, selects the job having the job number j7 that is late in the submitting sequence and whose owner is the user B and causes a node allocated to the job having the job number j7 to start executing this job.

Upon causing execution of the job having the job number j7 to be started, the management node 201 computes the fair-share value of the user B, who is the owner of the job having the job number j7, using equation (1) and equation (2) and thus obtains a value of 30000. In such a manner, since the fair-share allocation ratio of the user B is the same as that of the user A, the fair-share usage amount of the user B is the same as the fair-share usage amount of the user A. At this point, all the nodes are in use, and the timing at which the next job is selected is a time t1 at which execution of the jobs having the job number j1 and the job number j7 is finished.

When a job is selected at the time t1, the management node 201 adds fair-share recovery amounts in accordance with the amount of elapsed time to the fair-share values of the users A and B. The values added are the same, the fair-share recovery amounts=4000, since both the recovery factors of the users A and B are set to "1". As a result, the fair-share value of the user A=34000 and the fair-share value of the user B=34000, and thus the dynamic priorities of the user A and the user B are the same. Therefore, the management node 201, as illustrated at (3) in FIG. 8, employs the submitting sequence for job section, selects the job having the job number j2 whose owner is the user A, and causes a node allocated to the job having the job number j2 to start executing this job.

Upon causing the node allocated to the job having the job number j2 to start executing the job, the management node 201 computes the fair-share value of the user A, who is the owner of the job having the job number j2, using equation (1) and equation (2) and thus obtains a value of 24000.

When a job is selected after execution of the job having the job number j2, the fair-share value of the user A=24000 and the fair-share value of the user B=34000, and thus the dynamic priority of the user B is higher. Note that the period of time that has elapsed from the time at which the job having the job number j2 was executed is less than 1 second, and therefore the recovery amount is not taken into account and is set to zero. Therefore, the management node 201, as illustrated at (4) in FIG. 8, selects the job having the job number j8 that is late in the submitting sequence and whose owner is the user B and causes a node allocated to the job having the job number j8 to start executing this job.

Upon causing the node allocated to the job having the job number j8 to start executing the job, the management node 201 computes the fair-share value of the user B, who is the owner of the job having the job number j8, using equation (1) and equation (2) and thus obtains a value of 24000. At this point, since all the nodes are again in use, the timing at which the next job is selected is a time t2 at which execution of the jobs having the job number j2 and the job number j8 is finished.

When selecting a job at the time t2, the management node 201 adds a fair-share recovery amount in accordance with the amount of elapsed time to the fair-share values of the users A and B. The values added are the same, the fair-share recovery amounts=4000, since both the recovery factors of the users A and B are set to "1". As a result, the fair-share value of the user A=28000 and the fair-share value of the user B=28000, and thus the dynamic priorities of the user A and the user B are the same. Therefore, the management node 201, as illustrated at (5) in FIG. 8, employs the submitting sequence for job selection, selects a job having the job number j3 whose owner is the user A, and causes a node allocated to the job having the job number j3 to start executing this job.

Upon causing the node allocated to the job having the job number j3 to start executing this job, the management node 201 computes the fair-share value of the user A, who is the owner of the job having the job number j3, using equation (1) and equation (2) and thus obtains a value of 18000.

When a job is selected after execution of the job having the job number j3, the fair-share value of the user A=18000 and the fair-share value of the user B=28000, and thus the dynamic priority of the user B is higher. Note that the period of time that has elapsed from the time at which the job having the job number j3 was executed is less than 1 second, and the recovery amount is not taken into account and is set to zero. Therefore, the management node 201, as illustrated at (6) in FIG. 8, selects a job having the job number j9 that is late in the submitting sequence and whose owner is the user B, and causes the node allocated to the job having the job number j9 to start executing this job.

Upon causing the node allocated to the job having the job number j9 to start executing this job, the management node 201 computes the fair-share value of the user B, who is the owner of the job having the job number j9, using equation (1) and equation (2) and thus obtains a value of 18000. At this point, all the nodes are again in use, the timing at which the next job is selected is a time t3 at which execution of the jobs having the job number j3 and the job number j9 are finished.

When selecting a job at the time t3, the management node 201 adds fair-share recovery amounts in accordance with the amount of elapsed time to the fair-share values of the users A and B. The values added of the users A and B are the same, the fair-share recovery amounts=4000, since both the recovery factors of the users A and B are set to "1". As a result, the fair-share value of the user A is 22000 and the fair-share value of the user B is 22000. The dynamic priorities of the users A and B are the same. Therefore, the management node 201, as illustrated at (7) in FIG. 8, employs the submitting sequence for job selection, selects a job having the job number j4 whose owner is the user A, and causes a node allocated to the job having the job number j4 to start executing this job.

Upon causing execution of the job having the job number j4 to be started, the management node 201 computes the fair-share value of the user A, who is the owner of the job, using equation (1) and equation (2) and thus obtains a value of 12000.

When a job is selected after execution of the job having the job number j4, the fair-share value of the user A=12000 and the fair-share value of the user B=22000. The dynamic priority of the user B is higher. Note that the period of time that has elapsed from the time at which the job having the job number j4 was executed is less than 1 second, the recovery amount is not taken into account and is set to zero. Therefore, the management node 201, as illustrated at (8) in FIG. 8, selects a job having the job number j10, whose owner is the user B, and causes a node allocated to the job having the job number j10 to start executing this job.

Upon causing the node allocated to the job having the job number j10 to start executing this job, the management node 201 computes the fair-share value of the user B, who is the owner of the job having the job number j10, using equation (1) and equation (2) and thus obtains a value of 12000. At this point, all the nodes are again in use, and thereafter the management node 201 performs control in a manner similar to that described above.

By this point, the allocation ratio of the computing resources of the user A to the user B resulting from execution of jobs is 1:1 since the number of executed jobs of the user A=4 and the number of executed jobs of the user B=4. This proves that resource allocation may be controlled so as to meet the target.

Next, FIG. 9, FIG. 10, FIG. 11, and FIG. 13 illustrate flowcharts of a resource allocation process performed by the management node 201. The flowcharts illustrated in FIG. 9 to FIG. 13 are set such that operations illustrated in FIG. 7 are performed.

Figure 9:
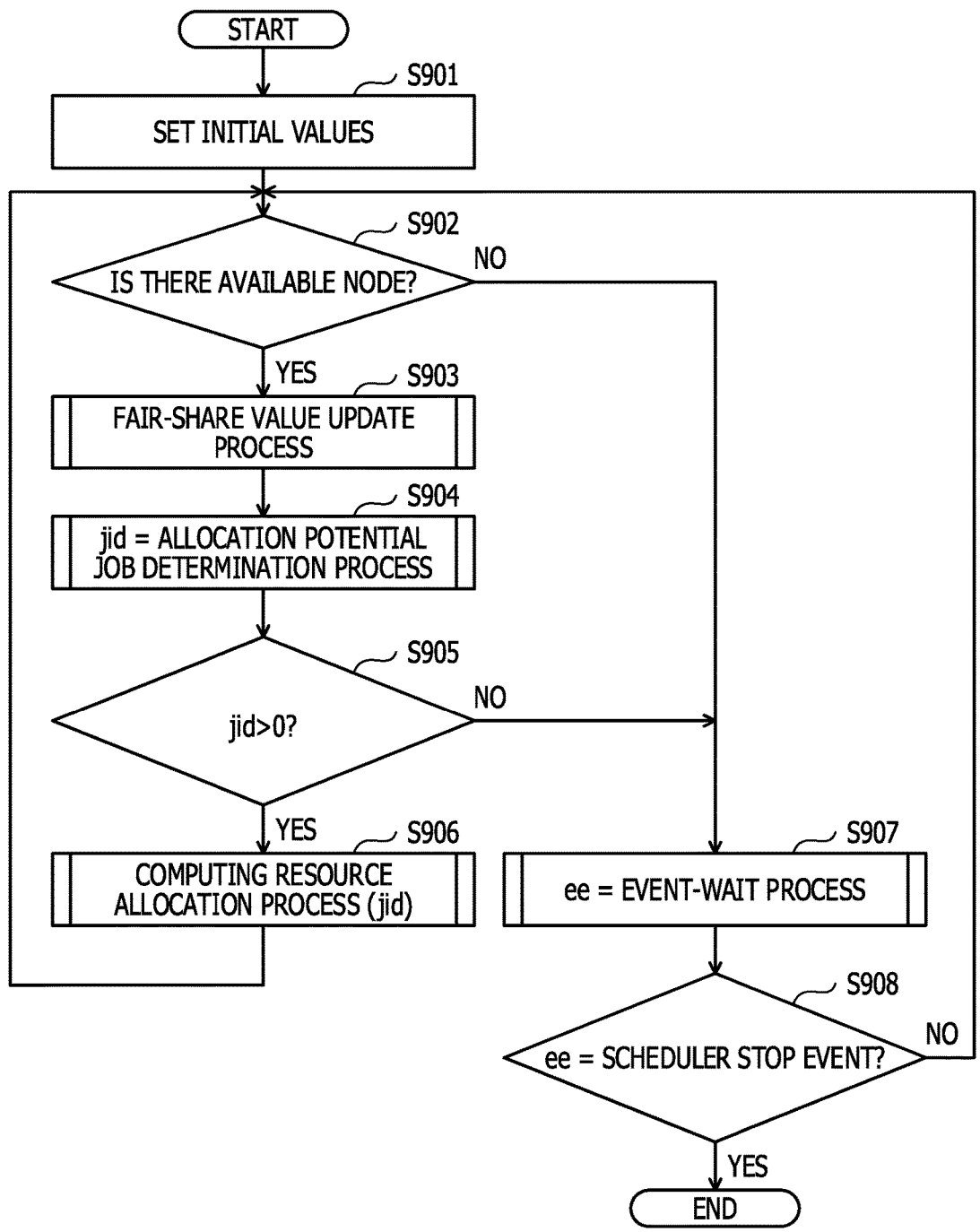
FIG. 9 is a flowchart illustrating an example of a resource allocation process procedure.

FIG. 9 is a flowchart illustrating an example of a resource allocation process procedure. The resource allocation process is a process of allocating computing resources to jobs. The management node 201 sets an initial value (step S901).

As processing in step S901, specifically, the management node 201 sets both the fair-share initial values of the user A and the user B to 40000. The management node 201 also sets the initial values of the recovery values per unit time to 40 for both the user A and the user B. The management node 201 also sets the initial values of the recovery factors to one both for the user A and the user B. The management node 201 also sets the initial value of the fair-share allocation ratio of the user A to one. The management node 201 also sets the initial value of the fair-share allocation ratio of the user B to two. The management node 201 also sets the initial value of the number of available nodes to the number of all nodes. The management node 201 also sets the initial value of a time at which a fair-share value is updated (hereinafter referred to as a fair-share value update time) to the current time.

Next, the management node 201 determines whether or not there is an available node (step S902). If there is an available node (step S902: Yes), the management node 201 performs a fair-share update process (step S903). The fair-share update process will be described with reference to FIG. 10. Then, the management node 201 performs an allocation potential job determination process (step S904). The allocation potential job determination process will be described with reference to FIG. 11. The management node 201 sets the identifier (ID) of an allocation potential job obtained by the allocation potential job determination process to jid.

Next, the management node 201 determines, as a processing result of the allocation potential job determination process, whether or not jid is larger than zero (step S905). Here, the case where jid is larger than zero indicates that there is an allocation potential job.

If jid is larger than zero (step S905: Yes), the management node 201 performs a computing resource allocation process (step S906). The computing resource allocation process will be described with reference to FIG. 12. Then, the management node 201 proceeds to the processing of step S902.

On the other hand, if there is no available node (step S902: No), or if jid is less than or equal to zero (step S905: No), the management node 201 performs an event-wait process (step S907). The event-wait process will be described with reference to FIG. 13. The management node 201 sets the ID of an event obtained by the event-wait process to ee.

Then, the management node 201 determines whether or not the event ee obtained by the event-wait process is a scheduler stop event (step S908). If the event ee is not a scheduler stop event (step S908: No), the management node 201 proceeds to the processing of step S902. On the other hand, if the event ee is a scheduler stop event (step S908: Yes), the management node 201 completes the resource allocation process. By performing the resource allocation process, the management node 201 may allocate computing resources to jobs in accordance with the fair-share allocation ratio without wasting computing resources.

Figure 10:
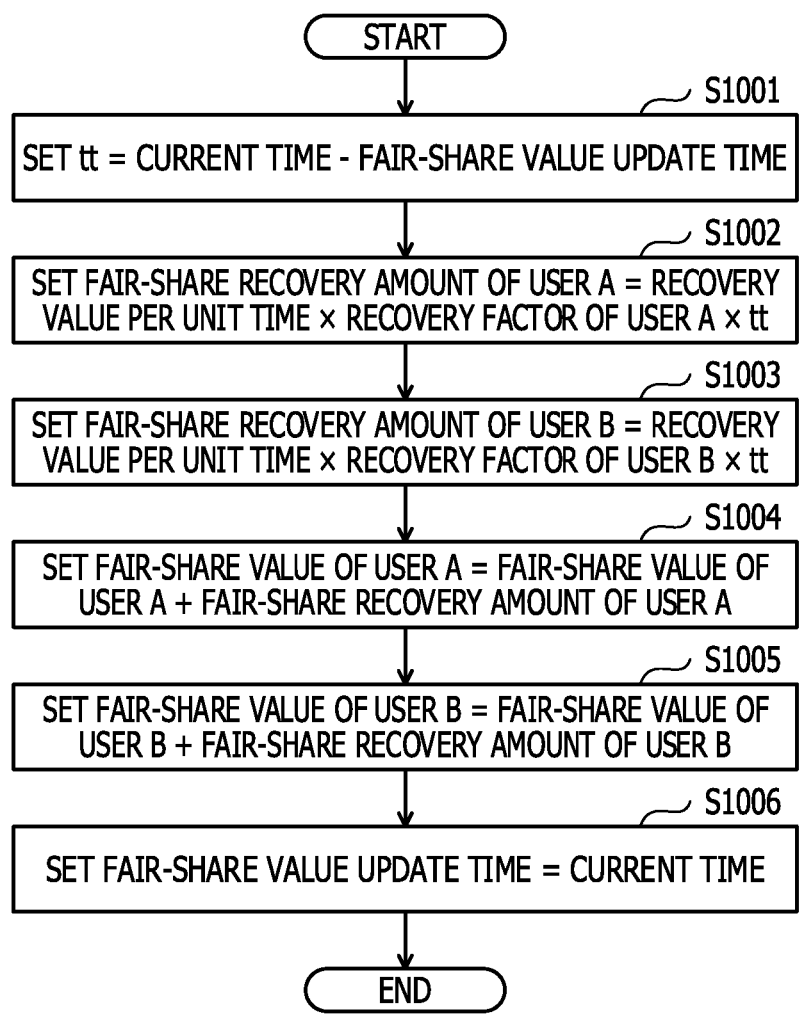
FIG. 10 is a flowchart illustrating an example of a fair-share value update process procedure.

FIG. 10 is a flowchart illustrating an example of a fair-share value update process procedure. The fair-share value update process is a process of updating a fair-share value.

The management node 201 sets tt to the current time—the fair-share value update time (step S1001). Next, the management node 201 sets the fair-share recovery amount of the user A to the recovery value per unit time×the recovery factor of the user A×tt (step S1002). The management node 201 also sets the fair-share recovery amount of the user B to the recovery value per unit time×the recovery factor of the user B×tt (step S1003). Next, the management node 201 sets the fair-share value of the user A to the fair-share value of the user A+the fair-share recovery amount of the user A (step S1004). The management node 201 also sets the fair-share value of the user B to the fair-share value of the user B+the fair-share recovery amount of the user B (step S1005). Then, the management node 201 sets the fair-share value update time to the current time (step S1006).

After finish of the processing of step S1006, the management node 201 completes the fair-share value update process. By performing the fair-share value update process, the management node 201 may recover the fair-share value decreasing with time.

Figure 11:
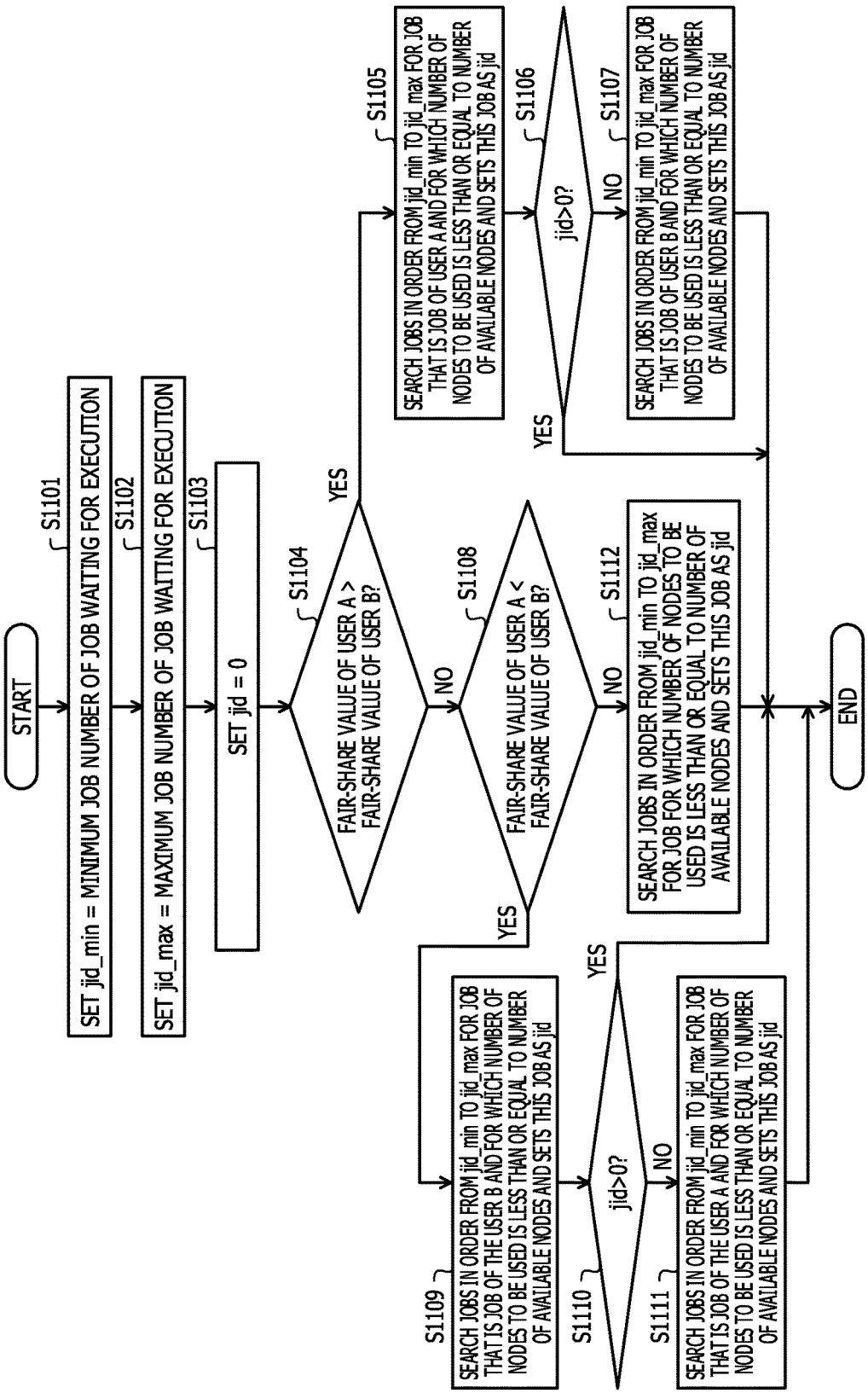
FIG. 11 is a flowchart illustrating an example of an allocation potential job determination process procedure.

FIG. 11 is a flowchart illustrating an example of the allocation potential job determination process procedure. The allocation potential job determination process is a process of determining a job serving as a potential job to which resources are likely to be allocated.

The management node 201 sets jid_min as a minimum job number of a job waiting for execution (step S1101). The management node 201 also sets jid_max as a maximum job number of a job waiting for execution (step S1102). The management node 201 also sets jid to zero (step S1103).

Next, the management node 201 determines whether or not the fair-share value of the user A is larger than the fair-share value of the user B (step S1104). If the fair-share value of the user A is larger than the fair-share value of the user B (step S1104: Yes), the management node 201 searches jobs in the order from jid_min to jid_max for a job that is a job of the user A and for which the number of nodes to be used is less than or equal to the number of available nodes and sets this job as jid (step S1105). Then, the management node 201 determines whether or not jid is larger than zero (step S1106). If jid is less than or equal to zero (step S1106: No), the management node 201 searches jobs in the order from jid_min to jid_max for a job that is a job of the user B and for which the number of nodes to be used is less than or equal to the number of available nodes and sets this job as jid (step S1107). After the processing in step S1107 is finished or if jid is larger than zero (step S1106: Yes), the management node 201 completes the allocation potential job determination process.

On the other hand, the fair-share value of the user A is less than or equal to the fair-share value of the user B (step S1104: No), the management node 201 determines whether or not the fair-share value of the user A is less than the fair-share value of the user B (step S1108). If the fair-share value of the user A is less than the fair-share value of the user B (step S1108: Yes), the management node 201 searches jobs in the order from jid_min to jid_max for a job that is a job of the user B and for which the number of nodes to be used is less than or equal to the number of available nodes and sets this job as jid (step S1109). Then, the management node 201 determines whether or not jid is larger than zero (step S1110). If jid is less than or equal to zero (step S1110: No), the management node 201 searches jobs in the order from jid_min to jid_max for a job that is a job of the user A and for which the number of nodes to be used is less than or equal to the number of available nodes and sets this job as jid (step S1111). After the processing in step S1111 is finished or if jid is larger than zero (step S1110: Yes), the management node 201 completes the allocation potential job determination process.

If the fair-share value of the user A is larger than or equal to the fair-share value of the user B (step S1108: No), the management node 201 searches jobs in the order of jid_min to jid_max for a job for which the number of nodes to be used is less than or equal to the number of available nodes and sets this job as jid (step S1112). After the processing in step S1112 is finished, the management node 201 completes the allocation potential job determination process. By performing the allocation potential job determination process, the management node 201 may determine a job serving as a potential job to which resources are likely to be allocated.

FIG. 12 is a flowchart illustrating an example of a computing resource allocation process procedure. The computing resources allocation process is a process of allocating computing resources to a job. The computing resource allocation process accepts jid set in step S904 as an argument.

The management node 201 sets 'node' as the number of nodes to be used for a job having a number of jid (step S1201). Next, the management node 201 sets 'elapse' as the period of time for exclusive use of the job having the number of jid (step S1202). Then, the management node 201 allocates nodes corresponding to the number of 'node' and the period of time of 'elapse' (step S1203). Next, the management node 201 sets uu as the user ID of the job having the number of jid (step S1204). Then, the management node 201 determines the fair-share usage amount to be 'node'× 'elapse'/the fair-share allocation ratio of the user uu (step S1205). Next, the management node 201 determines the fair-share value of the user uu to be the fair-share value of the user uu—the fair-share usage amount (step S1206). Then, the management node 201 causes the allocated nodes to start executing the job having the number of jid (step S1207).

After the processing of step S1207 is finished, the management node 201 completes the computing resource allocation process. By performing the computing resource allocation process, the management node 201 may allocate computing resources to a job.

FIG. 13 is a flowchart illustrating an example of an event-wait process procedure. The event-wait process is a process of performing processing in accordance with an accept event.

The management node 201 sets ee as an acceptance event (step S1301). Here, the acceptance event is any of a new job submission event, a job execution completion event, and a scheduler stop event.

Next, the management node 201 determines whether or not ee is a job execution completion event (step S1302). If ee is a job execution completion event (step S1302: Yes), the management node 201 sets jid as the number of a job whose execution is completed (step S1303). Next, the management node 201 sets 'node' as the number of nodes to be used for the job having the number of jid (step S1304). Then, the management node 201 sets 'elapse' as the period of time exclusively used for the job having the number of jid (step S1305). Next, the management node 201 sets ss as a time at which execution of the job having the job number of jid starts (step S1306). Then, the management node 201 sets uu as the user ID of the job having the job number of jid (step S1307).

Next, the management node 201 determines the fair-share return amount to be 'node'×('elapse'−(the current time×ss))/the fair-share allocation ratio of the user uu (step S1308). Then, the management node 201 sets the fair-share value of the user uu to be the fair-share value of the user uu+the fair-share return amount (step S1309). After the processing of step S1309 is finished or if ee is not a job execution completion event (step S1302: No), the management node 201 completes the event-wait process. By performing the event-wait process, the management node 201 may perform processing in accordance with the acceptance event.

As described above, the management node 201 determines the fair-share usage amount of each user that is subtracted from the fair-share value of each user based on the fair-share allocation ratio of each user. Thus, the difference in the fair-share value of each user is in accordance with the fair-share allocation ratio of the user at any timing, and therefore computing resources may be allocated to jobs requested by each user without wasting resources.

With the management node 201, in response to allocation of any node to a job requested by each user, the fair-share usage amount of each user may be determined based on the number of allocated nodes and the fair-share allocation ratio of the user. When the period of time during which a processor is used and that is to be used by a job requested by each user has a fixed value at any time and all the periods of time during which a processor is used are equal, each fair-share usage amount depends on the number of allocated nodes and the fair-share allocation ratio of each user. In this case, the management node 201 may allocate computing resources to jobs requested by each user in the fair-share allocation ratio of the user without wasting computing resources of the node #1 to #n. In this case, the period of time during which a processor is used and that is to be used by a job requested by each user does not have to be taken into account, and the management node 201 may reduce the load imposed on job control correspondingly.

With the management node 201, in response to the fact that the period of time during which a node is used are allocated to jobs requested by each user, the fair-share usage amount of each user may be determined based on the time period of time described above and the fair-share allocation ratio of each user. When the number of processors used by a job has a fixed value at any time, each fair-share usage amount depends on the period of time during which a node is used for a job of each user, and the fair-share allocation ratio of the user. In this case, the management node 201 may allocate computing resources to jobs requested by each user in a fair-share allocation ratio among jobs without wasting computing resources of the node #1 to #n. In this case, the number of processors requested by a job does not have to be taken into account, and therefore the management node 201 may reduce the load imposed on job control correspondingly.

It is assumed that after the above-mentioned period of time is allocated to a job requested by each user, the job requested by each user exits within the above-mentioned period of time. At this point, with the management node 201, the fair-share return amount may be determined based on the amount of time from a time at which the job requested by each user exits to a time at which the above-mentioned period of time has elapsed, and the fair-share allocation ratio of each user. Thus, when a job requested by each user exits within the above-mentioned period of time, the management node 201 may maintain the fair-share allocation ratio of each user and allocate computing resources to the job requested by each user.

Note that the job control method described in the present embodiment may be implemented by executing a program provided in advance on a computer such as a personal computer or a work station. This job control program is recorded on a computer-readable recording medium such as a hard disk, a flexible disk, a compact disc-read only memory (CD-ROM), or a digital versatile disk (DVD) and is executed when read from the recording medium by a computer. This job control program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
    a memory configured to store a plurality of job requests of a plurality of users, each of the job requests are to be assigned to at least one of a plurality of computing resources based on a priority, the priority being determined by an allocation ratio assigned for each of the plurality of users; and
    processing circuitry configured to:
        assign a first job request among the plurality of job requests to the at least one of the plurality of computing resources;
        determine, when the first job request is assigned, a decrease degree of the priority of a first user corresponding to the first job request by dividing a given value by an allocation ratio of the first user, the allocation ratio of the first user being a ratio which represents a relative size of an allocation amount for the first user with respect to others of the plurality of users whose job requests are stored in the memory;
        modify the priority of the first user based on the determined decrease degree of the priority of the first user; and
        assign a second job request among the plurality of job requests to at least one of the plurality of computing resources, based on the modified priority of the first user, a priority of the second user and priority of remaining plurality of users whose job requests are stored in the memory.

2. The information processing system according to claim 1, wherein
    the computing resources are at least one of a plurality of processors, and
    the processing circuitry is further configured to
        determine, in response to allocating the processors to the first job request, the decrease degree of the priority of the first user, based on a number of the processors, the allocation ratio of the first user and the allocation ratios of the other plurality of users whose job requests are stored in the memory.

3. The information processing system according to claim 1, wherein
    the computing resources are a first period of time during which at least one of a plurality of processors is used, and
    the processing circuitry is further configured to determine, in response to allocating the first period of time to the first job request, the decrease degree of the priority of the first user, based on the period of time, the allocation ratio of the first user and the allocation ratios of the other plurality of users whose job requests are stored in the memory.

4. The information processing system according to claim 3, wherein
the processing circuitry is further configured to determine, when processing of the first job request is finished within the period of time after the period of time is allocated to the first job request, an amount the priority of the first user is raised, based on the allocation ratio of the first user, the allocation ratios of the other plurality of users whose job requests are stored in the memory, and a second period of time, the second period of time being a time at which the processing of the first job request is finished to a time at which the first period of time has elapsed.

5. The information processing system according to claim 1, further comprising:
the plurality of computing resources,
wherein the processing circuitry is configured to control allocating part of the computing resources to the at least one of the plurality of job requests.

6. A method comprising:
storing, in a memory, a plurality of job requests of a plurality of users, each of the job requests are to be assigned to at least one of a plurality of computing resources based on a priority, the priority being determined by an allocation ratio assigned for each of the plurality of users;
assigning, by a processing circuitry, a first job request among the plurality of job requests to the at least one of the plurality of computing resources;
determining, by the processing circuitry, when the first job request is assigned, a decrease degree of the priority of a first user corresponding to the first job request by dividing a given value by an allocation ratio of the first user, the allocation ratio of the first user being a ratio which represents a relative size of an allocation amount for the first user with respect to others of the plurality of users whose job requests are stored in the memory;
modifying, by the processing circuitry, the priority of the first user based on the determined decrease degree of the priority of the first user; and
assigning, by the processing circuitry, a second job request among the plurality of job requests to at least one of the plurality of computing resources, based on the modified priority of the first user, a priority of the second user and priority of remaining plurality of users whose job requests are stored in the memory.

7. The method according to claim 6, wherein
the computing resources are at least one of a plurality of processors, and
the determining determines, in response to allocating the processors to the first job request, the decrease degree of the priority of the first user, based on a number of the processors, the allocation ratio of the first user and the allocation ratios of the other plurality of users whose job requests are stored in the memory.

8. The method according to claim 6, wherein
the computing resources are a first period of time during which at least one of a plurality of processors is used, and
the determining determines, in response to allocating the first period of time to the first job request, the decrease degree of the priority of the first user, based on the period of time, the allocation ratio of the first user and the allocation ratios of the other plurality of users whose job requests are stored in the memory.

9. The method according to claim 8, wherein
the determining determines, when processing of the first job request is finished within the period of time after the period of time is allocated to the first job request, an amount the priority of the first user is raised, based on the allocation ratio of the first user, the allocation ratios of the other plurality of users whose job requests are stored in the memory, and a second period of time, the second period of time being a time at which the processing of the first job request is finished to a time at which the first period of time has elapsed.

10. A non-transitory computer readable medium having stored therein a program that causes a computer to execute a process, the process comprising:
storing, in a memory, a plurality of job requests of a plurality of users, each of the job requests are to be assigned to at least one of a plurality of computing resources based on a priority, the priority being determined by an allocation ratio assigned for each of the plurality of users;
assigning a first job request among the plurality of job requests to the at least one of the plurality of computing resources;
determining, when the first job request is assigned, a decrease degree of the priority of a first user corresponding to the first job request by dividing a given value by an allocation ratio of the first user, the allocation ratio of the first user being a ratio which represents a relative size of an allocation amount for the first user with respect to others of the plurality of users whose job requests are stored in the memory;
modifying the priority of the first user based on the determined decrease degree of the priority of the first user; and
assigning, by the processing circuitry, a second job request among the plurality of job requests to at least one of the plurality of computing resources, based on the modified priority of the first user, a priority of the second user and priority of remaining plurality of users whose job requests are stored in the memory.

11. The non-transitory computer readable medium according to claim 10, wherein
the computing resources are at least one of a plurality of processors, and
the determining determines, in response to allocating the processors to the first job request, the decrease degree of the priority of the first user, based on a number of the processors, the allocation ratio of the first user and the allocation ratios of the other plurality of users whose job requests are stored in the memory.

12. The non-transitory computer readable medium according to claim 10, wherein
the computing resources are a first period of time during which at least one of a plurality of processors is used, and
the determining determines, in response to allocating the first period of time to the first job request, the decrease degree of the priority of the first user, based on the period of time, the allocation ratio of the first user and the allocation ratios of the other plurality of users whose job requests are stored in the memory.

13. The non-transitory computer readable medium according to claim 12, wherein
the determining determines, when processing of the first job request is finished within the period of time after the period of time is allocated to the first job request, an amount the priority of the first user is raised, based on the allocation ratio of the first user, the allocation ratios of the other plurality of users whose job requests are stored in the memory, and a second period of time, the second period of time being a time at which the processing of the first job request is finished to a time at which the first period of time has elapsed.

* * * * *